United States Patent [19]

Chozianin et al.

[11] 3,955,010

[45] May 4, 1976

[54] EMULSIFIED OIL DRESSINGS

[75] Inventors: Chris Chozianin, Morton Grove; John G. Oles, Glenview, both of Ill.

[73] Assignee: Kraftco Corporation, Glenview, Ill.

[22] Filed: Sept. 11, 1974

[21] Appl. No.: 505,048

Related U.S. Application Data

[63] Continuation-in-part of Ser. No. 268,746, July 3, 1974, abandoned, which is a continuation-in-part of Ser. No. 66,653, Aug. 24, 1970, abandoned.

[52] U.S. Cl. .................................. 426/605; 426/271
[51] Int. Cl.$^2$ ............................................ A23L 1/24
[58] Field of Search ........... 426/151, 196, 201, 202, 426/605

[56] References Cited

UNITED STATES PATENTS

| | | | |
|---|---|---|---|
| 2,264,593 | 12/1941 | Schapiro | 426/196 |
| 2,844,470 | 7/1958 | Akerboom | 426/196 |
| 2,983,618 | 5/1961 | Melnick | 426/196 |

OTHER PUBLICATIONS

Furia, Ed. Handbook of Food Additives, Chem. Rubber Co., Cleveland, Ohio, 1968, pp. 153 & 169–171.

*Primary Examiner*—Jeanette M. Hunter
*Attorney, Agent, or Firm*—Fitch, Even, Tabin & Luedeka

[57] ABSTRACT

An improved emulsified oil dressing composition which is resistant to bacteriological spoilage at room temperature and which may have low fat and low acid with good palatability. The composition contains from about 1 to 50 percent of an edible vegetable oil and from about 40 to 80 percent moisture. Egg yolk is present at a level of less than 8 percent. An edible acidifying agent is present at a level of less than 1.8 percent equivalent glacial acetic acid by weight of the moisture in the composition and the composition has a pH in the range of between about 3.5 and 4.1. Bacterial nutrient ingredients are present in the composition at a level of less than about 1.0 percent by weight of the composition.

5 Claims, No Drawings

EMULSIFIED OIL DRESSINGS

The present application is a Continuation-in-Part of copending application, Ser. No. 268,746, filed July 3, 1972 now abandoned which, in turn, was a Continuation-in-Part of an application, Ser. No. 66,653, filed Aug. 24, 1970 now abandoned.

The present invention relates generally to improved emulsified oil dressings and more particularly relates to improved emulsified oil dressings having a low level of acid but low pH and improved storage qualities.

As used herein the term "emulsified oil dressing" refers to three generally recognized types of dressings, these being mayonnaise, salad dressing and French dressing. The term "salad dressing" refers to salad dressing as generally defined by the United States Federal Standards. Salad dressing, as thus defined, is the emulsified food prepared from an edible vegetable oil, an acidifying ingredient selected from vinegar, lemon juice or lime juice, an egg-yolk containing ingredient, and a cooked or partly cooked starch paste prepared from a food starch, tapioca flour, wheat flour, rye flour or combinations of these starchy materials and water. Salad dressing may be seasoned with one or more of the following ingredients: Salt, sugar or other sweetening agent, mustard, paprika or other spice or spice oil or extract, monosodium glutamate and any suitable, harmless food seasoning or flavoring. The salad dressing may also contain optional emulsifying ingredients in addition to egg yolk, such as gum acacia, carob bean gum, guar gum, gum karaya, gum tragacanth, carrageenan, pectin, propylene glycol ester of alginic acid, sodim carboxymethylcellulose or any mixture of two or more of the emulsifying ingredients.

Salad dressing, as defined by the Federal Standards, contains not less than 30 percent by weight of vegetable oil and not less egg-yolk containing ingredient than is equivalent to egg-yolk solids provided by liquid egg yolk at a level of 4 percent by weight.

Mayonnaise is generally similar to salad dressing in consistency and texture and differs primarily in that a starch paste is not used in the preparation of mayonnaise. Also, the optional emulsifying ingredients are not permitted in the manufacture of mayonnaise in accordance with the Federal Standards. Mayonnaise contains not less than 65 percent by weight of vegetable oil.

French dressing differs from mayonnaise and salad dressing in that emulsification is usually effected by means of a vegetable or seaweed gums. Egg yolk or starch may be present, but at reduced levels in comparison with mayonnaise or salad dressing.

Typical formulations for salad dressing, mayonnaise and French dressing have the following ingredients at the indicated range of levels, expressed in weight percent:

| Ingredients | Salad Dressing | Mayonnaise | French Dressing |
| --- | --- | --- | --- |
| Vegetable oil | 30–55 | 75–85 | 35–60 |
| Liquid egg yolk | 4–10 | 4–10 | 0–4 |
| Acidifying ingredient (expressed as percent acetic acid on the basis of the moisture present) | 2.1–3.0 | 1.8–3.0 | 2.0–3.0 |
| Sugar | 7–12 | .5–1.5 | 2–15 |
| Moisture | 20–50 | 4–20 | 20–55 |
| Starch | 3–6 | — | 0–3 |
| Salt | 1–1.5 | 1–1.5 | 1–2 |
| Gum (vegetable or seaweed) | — | — | .50–.75 |

As used herein acid levels refer to equivalent glacial acetic acid, unless otherwise specified. It has been generally believed that the level of acid in emulsified oil dressings, if used alone, should be at least about 2.0 percent by weight on the basis of the level of moisture present in the salad dressing to prevent bacterial spoilage of the salad dressing at room temperature.

It has also been believed that there is a correlation between the level of sugar present in the emulsified oil dressing and the level of acid required to prevent bacterial, yeast or mold spoilage at room temperature. The general principle has been that a lower level of acid is required as the level of sugar is increased and vice versa. Consequently, due to the level of sugar present in salad dressing and French dressing, it has been thought permissible to lower the level of the acidifying ingredient to about 2 percent by weight of the moisture present. It has not been believed to be possible to reduce the level of acidifying ingredient below the above-indicated level, and still obtain a bacteriologically stable salad dressing at room temperature, even with relatively high levels of sugar present.

It would be desirable to provide an emulsified oil dressing, like mayonnaise, salad dressing and French dressing, or other possible dressings, with a low level of acidifying ingredient, below about 1.8 percent by weight of the moisture present, so as to provide a dressing with a bland, less sharp taste and which is bacteriologically stable at room temperature. However, as previously indicated, this has not been thought possible because of the effect on bacteriological stability contributed by the acidifying ingredient at the previously thought necessary level of above about 2.0 percent by weight of the moisture present.

The manufacture of low acid food dressings is disclosed in U.S. Pat. No. 2,844,470 to Akerboom, which issued July 22, 1958. As disclosed in this Patent, such low acid dressings are not bacteriologically stable unless each of three distinct preservative factors are present; these being pasteurization of egg yolk materials under particular conditions, storage in pressurized containers and storage at temperatures of 45°F.

U.S. Pat. No. 2,264,593 to Schapiro, which issued Dec. 2, 1941, discloses obtaining preservation by the addition of monochloroacetic acid to mayonnaise. While this patent sets forth low levels of acid in the mayonnaise, bacteriological stability requires the presence of monochloroacetic acid which is not an acceptable food ingredient. Furthermore, eggs and the yolk of eggs at the levels of the Schapiro patent provide buffering agents to the aqueous phase and thereby cause the aqueous phase to resist lowering of the pH to desired levels to achieve desired protection against Salmonella and other bacteriological spoilage. Of course, higher levels of acid can lower the pH, but this requires undesired acid addition.

It has now been discovered that an emulsified oil dressing with a level of acid of less than 1.8 percent by weight of the moisture present in the dressing can be prepared which is bacteriologically stable at room temperature when the dressing is prepared in accordance with the composition and method of the invention. By bacteriologically stable is meant that the dressing is resistant to growth of bacteria when stored at normal room temperature of from about 60°F. to about 90°F. for a period of at least about six weeks. The low acid level may not satisfactorily protect against yeast and mold so that microstatic agents are required. However, such agents are available which are food safe at proper levels of usage.

Accordingly, it is the principal object of the present invention to provide an improved emulsified oil dressing. It is another object of the present invention to provide an improved emulsified oil dressing with a bland flavor. It is a further object of the present invention to provide an improved emulsified oil dressing of the mayonnaise, salad dressing and French dressing types. It is still a further object of the present invention to provide an improved emulsified oil dressing with a low level of acid which is bacteriologically stable at room temperature.

A bodying agent is desirably used in the emulsified oil dressing to provide desired body and texture. The bodying agent may be the starch paste heretofore used in salad dressing or may comprise an edible gum such as xanthan gum, guar gum, propylene glycol ester of alginic acid or the like. Starch, if used, is present at a level of from about 2 percent to about 10 percent. The edible gum will be present at lower levels to provide desired body and texture.

An edible acidifying ingredient is also present at a critical level which is less than 1.8 percent by weight of the moisture. All acid levels are expressed in terms of equivalent glacial acetic acid.

Bacteriological spoilage is prevented in the improved salad dressing compositions of the invention by limiting bacterial nutrient ingredients to less than about 1 percent by weight of the salad dressing composition while maintaining the acidity at a reduced level.

By "bacterial nutrient ingredient" is meant those ingredients which readily promote the growth of those microorganisms which are detrimental to public health or which make the product unpalatable from a flavor or appearance standpoint, hereinafter referred to as spoilage organisms. Such ingredients are primarily carbohydrate materials, such as sugar, dextrose, corn syrup solids, invert sugar, maltose, glucose, honey solids and other ingredients which are readily consumed by the spoilage organisms during growth. Starch and gums are not ingredients which are readily consumed by the spoilage organisms during growth. The starch or gum must first undergo hydrolysis to convert it into a component saccharide material before the starch or gum may be considered to be a growth promoter for spoilage organisms.

These and other objects of the invention will become more apparent from the following detailed description.

Generally, in accordance with various features of the invention, an improved, bland tasting, emulsified oil dressing composition which is resistant to bacteriological spoilage at room temperature is provided. The composition contains from about 1 to about 50 percent of an edible vegetable oil and from about 40 to about 80 percent of moisture. An emulsifying agent may be selected from egg or egg yolks, or the optional emulsifying agents, or combinations thereof.

The egg yolk should be present at a level of less than 8 percent, liquid basis, to achieve the benefits of the invention. Higher levels of egg yolk buffer the aqueous phase and limit desired pH control with low levels of acid addition.

Reduction of the level of acidic ingredient to a critical level below 1.8 percent of the level of moisture present in combination with restriction of the levels of bacterial nutrients at the same time is considered a significant and important departure from the prior art. It has generally been thought necessary in the dressing art to increase the ratio of acid to moisture as the level of sugar is reduced in salad dressing compositions. For example, in mayonnaise, which has a low level of sugar of from about 0.5 to about 1.5 percent, acid ranges from about 1.8 percent to about 3 percent, based on the level of moisture present, have been used. The salad dressing compositions where the sugar level generally is from about 7 to about 12 percent, acid levels of from about 2.1 percent to about 3 percent have been used. In the present invention, a low level of sugar and other bacterial nutrient ingredients is used, while at the same time the acid level, based on the level of moisture present, has been reduced to a critical range which is less than 1.8 percent.

Generally, the compositions of the invention have acid present at a level of at least 0.45 but less than about 1.8 percent equivalent glacial acetic acid based on the level of moisture present. This permits the preparation of emulsified oil dressing compositions with low levels of fat and high levels of moisture and which have a bland flavor and less acid flavor profile and taste generally similar to mayonnaise. The emulsified oil dressing compositions of the present invention may then be further flavored as desired to produce other flavoring variations, as will be readily apparent to one skilled in the art. If the acid level is below 0.45 percent, spoilage of the compositions when stored at room temperature may occur. For bland tasting mayonnaise type dressings, it is preferred to maintain the acid level in the range of 0.45 to 1 percent. Due to the low level of sugar and other bacteriological nutrient ingredients present in the composition, the increase in acidity by even small amounts results in large flavor changes. For some sharp tasting dressing products, such as French dressing types, a sharper flavor may be preferred and the acid level may be raised to within the range of 1 to about 1.8 percent. Higher levels of acid provide emulsified oil dressing products which are considered to be too harsh and acidic in flavor.

As previously discussed, it is necessary to provide an acidity of 0.45 percent equivalent glacial acetic acid or bacteriological spoilage at room temperature may occur. It has also been discovered that the pH of the emulsified oil dressing must be maintained at 4.1 or lower, preferably in the range of 3.5 to 4.1. It should be understood that the pH and level of acid are not directly related and are separate requirements for providing emulsified oil dressings of the invention. The pH of the dressings is dependent upon the titration capacities of the various ingredients of the dressing, particularly the amount and type of salts used. Stated another way, the ingredients of the emulsified oil dressing should not buffer to such an extent as to prevent achievement of the desired pH. The individual components of the dressing are chosen so as to provide a pH in the finished product of 4.1 or less and preferably within the range of 3.5 to 41.

Whole eggs and egg yolks contain protein and salts which buffer the aqueous phase and, if present at high levels, they prevent achievement of the desired pH range with low levels of acid. Accordingly, the egg yolks should be present at a level of less than 8 percent to prevent undesired buffering at the moisture and acid levels of the invention.

Various edible acids may be used to provide the required level of acid in the emulsified dressing compositions of the invention. Suitable edible acids are citric acid, phosphoric acid, hydrochloric acid, malic acid, acetic acid, formic acid, and mixtures thereof. It is important to note that the acid may consist of vinegar alone in achieving the desired pH range. By the term "equivalent glacial acetic acid" is meant that amount of a particular acid required which is considered to be equivalent to a given amount of glacial acetic acid.

Any suitable emulsifying agent may be used in the salad dressing compositions of the invention. In this connection, egg yolk solids, protein gum arabic, carob bean gum, guar gum, gum karaya, gum tragacanth, carrageenan, pectin, propylene glycol esters of alginic acid, sodium carboxymethyl-cellulose, polysorbates and mixtures thereof may be used as emulsifying agents. The use of emulsifying agents is optional and depends upon the particular type of emulsified oil being prepared. Emulsifying agents, when used, are present at levels of from about 1 percent to about 10 percent, depending on the particular emulsifying agent used. To comply with certain Federal Standards of the United States for certain salad dressing compositions, it is preferred that egg yolk be present in the salad dressing compositions at a level sufficient to comply with the Federal Standards, that is, a level equivalent to at least about 4 percent liquid egg yolk. However, the use of egg yolk is not essential to achieve the desired texture and mouth feel for the salad dressing compositions of the invention.

Starch paste is generally used as a bodying agent in the preparation of semisolid emulsified oil dressings, such as salad dressing, and may be used in the preparation of pourable emulsified oil dressings such as French dressing. The starch is present at a level of from about 1 to about 8 percent by weight in semi-solid dressings and at a level of from 0 percent to about 8 percent in pourable dressings. Any suitable starch containing material may be used, and in this connection, any food starch, whether modified, unmodified or pregelatinized, tapioca flour, potato flour, wheat flour, rye flour, rice flour or mixtures thereof may be used to provide the starch for use in preparing the compositions.

As before indicated, the bodying agent may comprise edible gums individually or in combination, and the gums will usually provide the desired body and texture at levels below those normally required when starch paste is used. The gums, when used as a bodying agent, will be present at a level of between about .25 percent and 2.5 percent.

In preparing the compositions of the invention, a starch or gum paste is first prepared. In the preparation of the paste, the starch and/or gum, most of the water to be used in the composition, and the acidifying ingredients are mixed together and are heated. Thereafter, the emulsifier and the dry ingredients, including oil, are mixed together and are emulsified by passing the mixture through conventional emulsification apparatus.

The emulsified oil dressing compositions of the invention generally have the following ingredients present at the indicated range of levels:

| Ingredients | Semi-Solid Type dressing Weight Percent | Pourable Type dressing Weight Percent |
| --- | --- | --- |
| Water | 40–60 | 40–80 |
| Vegetable Salad Oil | 10–50 | 1–50 |
| Starch Containing Material | 1–8 | 0–8 |
| Acidifying ingredient (expressed as percent equivalent glacial acetic acid based on the moisture present) | .45–1.8 | .45–1.8 |
| Egg yolk (liquid basis) (when used) | 4–8 | 0–6 |
| Salt | .1–3 | .1–3 |
| pH | 3.5–4.1 | 3.5–4.1 |

The emulsified oil dressing of the invention is generally stable against bacterial growth, however, it is necessary to provide agents to protect the dressings against the growth of certain yeasts and molds such as *zygosaccharromyces globiformis*. Suitable agents include sodium benzoate, potassium sorbate, sorbic acid, diethyl pyrocarbonate and combinations thereof. Ethylene diamine tetracetic acid (EDTA) may also be used as a sequestering agent to prevent flavor deterioration. The preservatives are used at a level of from about 0.02 percent to about 0.2 percent by weight of the composition. At lower levels of use the compositions are not protected against growth of certain yeast and molds. Higher levels of use provide protection but are not permitted under the laws.

It is also sometimes desirable to provide an artificial sweetening agent to provide a desired flavor. Suitable artificial sweetening agents include saccharin, dipeptides, cyclamates and combinations thereof.

The following examples illustrate various features of the present invention, but are intended to in no way limit the scope of the invention, which is defined in the appended claims.

EXAMPLE I

An improved salad dressing composition was prepared in accordance with the present invention. 8 pounds of modified waxy maize starch, 3.2 pounds of 100 grain vinegar, 51.75 pounds of water, and 1 pound of sodium chloride were added to a kettle equipped with a jacket for heating the mixture. The mixture was agitated and heated to a temperature of 195°F to gelatinize the starch and form a starch paste. The starch paste was then cooled to 100°F. To the kettle was then added 30 pounds of cottonseed oil, 5 pounds of liquid egg yolk, 1 pound of sodium chloride, 0.05 pound of sodium benzoate, 0.05 pound of potassium sorbate, 0.001 pound of EDTA, and 0.001 pound of saccharin. The mixture was agitated until a thorough dispersion of the ingredients was obtained.

The mixture was then passed through conventional homogenization equipment and was packaged into jars while at a temperature of 85°F to provide a salad dressing product. The salad dressing product had 0.56 percent equivalent glacial acetic acid based on the amount of water present and had a pH of 3.9. The salad dressing composition was stored for 30 weeks at a temperature of 72°F. No appreciable deterioration in flavor and no bacterial or mold growth was observed. The total level of addition of vinegar was equivalent to providing a level of acetic acid of 0.4 percent, based on the level of water percent.

EXAMPLE II

A study was made to determine the bacteriological safety of the emulsified oil dressing compositions of the invention. Eleven samples were prepared and these samples were each inoculated with various microorganisms. The samples were prepared in accordance with the procedure of Example I. The composition of the samples is set forth below in Table I. The results of the inouclation studies in respect to various organisms are set forth below in Tables II through VI.

The organisms chosen for the study were:
1. *Salmonella seftenberg*
2. *Staphylococcus aureus*
3. *E. coli*
4. *Zygoscharromyces globiformis*
5. *Proteolytic micrococcus*

The first three of the organisms, Salmonella, Staphylococcus and *E. coli* have a public health significance.

The *Zygoscharromyces globiformis* was chosen since this organism has been reported to grow at low pH ranges and is thought to be responsible for the spoilage of mayonnaise, salad dressing, and related products.

*Proteolytic micrococcus* was chosen since this organism is lipolytic and would be a potential contaminant which could grow where amounts of fat were available for its metabolism.

The test organisms were all grown on medias which were condusive to growth of the specific species growth. After adequate periods of growth the cells of each respective species were washed three times and suspended in sterile distilled water for subsequent inoculation. Washing the cells consisted of centrifuging the respective media at 15,000 rpm, discarding the supernatent fluid, re-suspending the cells in sterile distilled water and recentrifuging.

Inoculation was accomplished by direct inoculation into the sample with a pippette and the sample and inoculum thoroughly mixed with a sterile spatula.

The inoculated samples were allowed to remain at room temperature. An aliquot was taken at regular intervals to determine survival of the test organism. Plate counts were made using total count agar incubated for 2 days at 86°F. Selective media for the specific strains was also used intermittently to verify the presence of the specific test organism being enumerated.

From Tables II through VI, set forth below, it can be seen that the establishment of a pH within the indicated range of the invention is not alone sufficient to insure freedom from growth of spoilage organisms. Also, establishment of the level of acidity above the minimum level is also not alone sufficient. The use of preservatives is also not sufficient to provide an emulsified oil dressing with sufficient stability from spoilage organisms if the level of acidity is below the indicated range and if the pH is above that set forth.

Accordingly, it is believed that the compositions of the present invention describe new emulsified oil compositions which are characterized by having a low, but critical, level of acid and which also have a low level of carbohydrates. The emulsified oil dressings are stable against growth of spoilage bacteria for extended periods of time at room temperature.

Table I

| Sample No. | Product Appearance | Percent Moisture | Percent Fat | Percent Starch | Percent Glacial Acetic Acid Based on the Level of Moisture Present | Percent Salt | pH | Preservative Level of Addition |
|---|---|---|---|---|---|---|---|---|
| 1 | Good body | 54.81 | 38.55 | 4.6 | .62 | 1.72 | 3.7 | Na Benzoate 0.10% |
| 2 | Good body | 55.21 | 37.90 | 4.6 | .62 | 1.77 | 3.9 | Na Benzoate K Sorbate 0.05% each |
| 3 | Good body | 55.03 | 38.88 | 4.6 | .62 | 0.80 | 4.0 | Na Benzoate 0.10% |
| 4 | Liquid | 53.66 | 39.33 | 4.6 | .26 | 1.98 | 4.5 | Na Benzoate 0.10% |
| 5 | Liquid | 55.92 | 39.30 | 4.6 | .59 | 0.14 | 4.2 | Na Benzoate 0.10% |
| 6 | Liquid | 56.31 | 38.84 | 4.6 | .43 | 0.03 | 4.3 | Na Benzoate 0.10% |
| 7 | Liquid | 55.98 | 39.26 | 4.6 | .77 | 0.07 | 4.0 | Na Benzoate 0.10% |
| 8 | Liquid | 56.32 | 38.89 | 4.6 | 1.01 | 0.18 | 4.0 | Na Benzoate 0.10% |
| 10 | Good body | 55.23 | 37.60 | 4.6 | .25 | 1.77 | 4.4 | Na Benzoate 0.10% |
| 11 | Good body | 55.12 | 38.39 | 4.6 | .43 | 1.71 | 4.1 | Na Benzoate 0.10% |
| 12 | Good body | 54.13 | 39.45 | 4.6 | .80 | 1.69 | 3.9 | Na Benzoate 0.10% |

TABLE II

| Sample | Initial Count | Initial Inoculated | SALMONELLA SEFTENBERG | | | | | | | |
|---|---|---|---|---|---|---|---|---|---|---|
| | | | 1 Hour | 3 Hour | 5 Hour | 24 Hour | 48 Hour | 72 Hour | 96 Hour | 120 Hour |
| 1 | 7 | 4×10⁴ | <100 | <100 | <100 | <100 | <100 | <10 | <10 | <10 |
| 2 | 8 | 4×10⁴ | <100 | <100 | <100 | <100 | <100 | <10 | <10 | <10 |
| 3 | 4 | 4×10⁴ | 160 | <100 | <100 | <100 | <100 | <10 | <10 | <10 |
| 4 | <1 | 4×10⁴ | 1060 | 100 | <100 | <100 | <100 | <10 | <10 | <10 |
| 5 | <1 | 4×10⁴ | 20 | <100 | <100 | <100 | <100 | <10 | <10 | <10 |
| 6 | 6 | 4×10⁴ | 160 | <100 | <100 | <100 | <100 | <10 | <10 | <10 |
| 7 | <1 | 4×10⁴ | <100 | <100 | <100 | <100 | <100 | <10 | <10 | <10 |
| 8 | 4 | 4×10⁴ | <100 | <100 | <100 | <100 | <100 | <10 | <10 | <10 |
| 10 | <1 | 4×10⁴ | 500 | 750 | <100 | <100 | <100 | <10 | <10 | <10 |
| 11 | <1 | 4×10⁴ | 520 | <100 | <100 | <100 | <100 | <10 | <10 | <10 |

TABLE II-continued

| | | | SALMONELLA SEFTENBERG | | | | | | |
|---|---|---|---|---|---|---|---|---|---|
| Sample | Initial Count | Initial Inoculated | 1 Hour | 3 Hour | 5 Hour | 24 Hour | 48 Hour | 72 Hour | 96 Hour | 120 Hour |
| 12 | 9 | $4 \times 10^4$ | <100 | <100 | <100 | <100 | <100 | <10 | <10 | <10 |

TABLE III

| | | | | | E. COLI | | | | | | |
|---|---|---|---|---|---|---|---|---|---|---|---|
| Sample | Count Initial | Initial Inoculated | 1 Hour | 3 Hour | 5 Hour | 24 Hour | 48 Hour | 72 Hour | 96 Hour | 120 Hour | 144 Hour | 2 Weeks |
| 1 | 7 | $14 \times 10^6$ | $4 \times 10^6$ | $8 \times 10^5$ | $6 \times 10^5$ | $6 \times 10^4$ | $2 \times 10^4$ | 100 | <10 | <10 | <10 | <10 |
| 2 | 8 | $14 \times 10^6$ | $6 \times 10^6$ | $2 \times 10^6$ | $2 \times 10^6$ | $11 \times 10^4$ | $5 \times 10^4$ | 500 | <10 | <10 | <10 | <10 |
| 3 | 4 | $14 \times 10^6$ | $8 \times 10^6$ | $4 \times 10^6$ | $3 \times 10^6$ | $5 \times 10^5$ | $2 \times 10^4$ | 200 | <10 | <10 | <10 | <10 |
| 4 | <1 | $14 \times 10^6$ | $5 \times 10^6$ | $5 \times 10^6$ | $5 \times 10^6$ | $1 \times 10^6$ | $5 \times 10^5$ | $6 \times 10^4$ | $5 \times 10^4$ | $7 \times 10^4$ | $7 \times 10^4$ | <10 |
| 5 | <1 | $14 \times 10^6$ | $8 \times 10^6$ | $4 \times 10^6$ | $4 \times 10^6$ | $3 \times 10^5$ | $2 \times 10^4$ | <100 | <10 | <10 | <10 | <10 |
| 6 | 6 | $14 \times 10^6$ | $6 \times 10^6$ | $4 \times 10^6$ | $4 \times 10^6$ | $21 \times 10^3$ | $3 \times 10^3$ | 200 | <10 | <10 | <10 | <10 |
| 7 | <1 | $14 \times 10^6$ | $7 \times 10^6$ | $4 \times 10^6$ | $4 \times 10^6$ | $4 \times 10^4$ | 300 | <100 | <10 | <10 | <10 | <10 |
| 8 | 4 | $14 \times 10^6$ | $8 \times 10^6$ | $4 \times 10^6$ | $4 \times 10^6$ | $4 \times 10^4$ | 100 | <100 | <10 | <10 | <10 | <10 |
| 10 | <1 | $14 \times 10^6$ | $8 \times 10^6$ | $6 \times 10^6$ | $7 \times 10^6$ | $2 \times 10^6$ | $6 \times 10^4$ | $11 \times 10^4$ | $13 \times 10^3$ | $3 \times 10^3$ | $52 \times 10^2$ | <10 |
| 11 | <1 | $14 \times 10^6$ | $10 \times 10^6$ | $3 \times 10^6$ | $3 \times 10^6$ | $5 \times 10^5$ | $6 \times 10^4$ | $5 \times 10^3$ | 700 | <700 | 100 | <10 |
| 12 | 9 | $14 \times 10^6$ | $8 \times 10^6$ | $3 \times 10^6$ | $2 \times 10^6$ | $7 \times 10^4$ | $2 \times 10^4$ | <100 | <10 | <10 | <10 | <10 |

TABLE IV

| | | | | | STAPHYLOCOCCUS AUREUS | | | | | | |
|---|---|---|---|---|---|---|---|---|---|---|---|
| Sample | Initial Count | Initial Inoculated | 1 Hour | 3 Hour | 5 Hour | 24 Hour | 48 Hour | 72 Hour | 96 Hour | 120 Hour | 144 Hour | 2 Weeks |
| 1 | 7 | $34 \times 10$ | $32 \times 10^6$ | $5 \times 10^6$ | $4 \times 10^5$ | $3 \times 10^5$ | 400 | <100 | <10 | <10 | <10 | <10 |
| 2 | 8 | $34 \times 10$ | $32 \times 10^6$ | $9 \times 10^6$ | $5 \times 10^5$ | $2 \times 10^5$ | 800 | 200 | <10 | <10 | <10 | <10 |
| 3 | 4 | $34 \times 10$ | $29 \times 10^6$ | $9 \times 10^6$ | $2 \times 10^6$ | $4 \times 10^5$ | $5 \times 10^3$ | 300 | <10 | <10 | <10 | <10 |
| 4 | <1 | $34 \times 10$ | $34 \times 10^6$ | $32 \times 10^6$ | $9 \times 10^6$ | $8 \times 10^6$ | $2 \times 10^6$ | $2 \times 10^6$ | $1 \times 10^6$ | $2 \times 10^5$ | $2 \times 10^5$ | 1500 |
| 5 | <1 | $34 \times 10$ | $32 \times 10^6$ | $12 \times 10^6$ | $6 \times 10^6$ | $3 \times 10^5$ | $2 \times 10^6$ | $9 \times 10^4$ | 2000 | 2000 | <10 | <10 |
| 6 | 6 | $34 \times 10$ | $36 \times 10^6$ | $33 \times 10^6$ | $8 \times 10^6$ | $3 \times 10^6$ | $2 \times 10^4$ | $24 \times 10^3$ | 3000 | 100 | 300 | <10 |
| 7 | <1 | $34 \times 10$ | $20 \times 10^6$ | $9 \times 10^6$ | $5 \times 10^6$ | $6 \times 10^5$ | $2 \times 10^4$ | 200 | 100 | <10 | <10 | <10 |
| 8 | 4 | $34 \times 10$ | $32 \times 10^6$ | $7 \times 10^6$ | $3 \times 10^{66}$ | $2 \times 10^5$ | $3 \times 10^4$ | 200 | 100 | <10 | <10 | <10 |
| 10 | <1 | $34 \times 10$ | $22 \times 10^6$ | $19 \times 10^6$ | $14 \times 10^6$ | $7 \times 10^6$ | $5 \times 10^5$ | $3 \times 10^5$ | $6 \times 10^5$ | $1 \times 10^5$ | $5 \times 10^4$ | 1800 |
| 11 | <1 | $34 \times 10$ | $32 \times 10^6$ | $12 \times 10^6$ | $4 \times 10^6$ | $3 \times 10^6$ | $6 \times 10^4$ | $1 \times 10^4$ | 400 | 10 | <10 | <10 |
| 12 | 9 | $34 \times 10$ | $28 \times 10^6$ | $7 \times 10^6$ | $2 \times 10^6$ | $4 \times 10^4$ | <100 | <100 | <100 | <10 | <10 | <10 |

TABLE V

| | | | | PROTEOLYTIC MICROCOCCUS | | | | | | |
|---|---|---|---|---|---|---|---|---|---|---|
| Sample | Count Initial | Initial Inoculated | 1 Hour | 3 Hour | 5 Hour | 24 Hour | 48 Hour | 72 Hour | 96 Hour | 120 Hour | 2 Week |
| 1 | 7 | $20 \times 10^6$ | $20 \times 10^6$ | $15 \times 10^6$ | $6 \times 10^6$ | $2 \times 10^6$ | 1100 | <100 | <10 | <10 | <10 |
| 2 | 8 | $20 \times 10^6$ | $15 \times 10^6$ | $10 \times 10^6$ | $8 \times 10^6$ | $2 \times 10^6$ | 900 | <100 | <10 | <10 | <10 |
| 3 | 4 | $20 \times 10^6$ | $18 \times 10^6$ | $13 \times 10^6$ | $6 \times 10^6$ | $6 \times 10^6$ | $9 \times 10^4$ | 1600 | <10 | <10 | <10 |
| 4 | <1 | $20 \times 10^6$ | $20 \times 10^6$ | $16 \times 10^6$ | $18 \times 10^6$ | $13 \times 10^6$ | $2 \times 10^6$ | $2 \times 10^6$ | $7 \times 10^5$ | $6 \times 10^4$ | 900 |
| 5 | <1 | $20 \times 10^6$ | $17 \times 10^6$ | $15 \times 10^6$ | $16 \times 10^6$ | $10 \times 10^6$ | $3 \times 10^6$ | $7 \times 10^5$ | $3 \times 10^4$ | $3 \times 10^3$ | <10 |
| 6 | 6 | $20 \times 10^6$ | $15 \times 10^6$ | $13 \times 10^6$ | $14 \times 10^6$ | $8 \times 10^6$ | $4 \times 10^6$ | $2 \times 10^6$ | $1 \times 10^5$ | $2 \times 10^3$ | <10 |
| 7 | <1 | $20 \times 10^6$ | $15 \times 10^6$ | $10 \times 10^6$ | $8 \times 10^6$ | $8 \times 10^6$ | $2 \times 10^6$ | $8 \times 10^5$ | $6 \times 10^2$ | 100 | <10 |
| 8 | 4 | $20 \times 10^6$ | $20 \times 10^6$ | $18 \times 10^6$ | $14 \times 10^6$ | $13 \times 10^6$ | $3 \times 10^5$ | 100 | <10 | <10 | <10 |
| 10 | <1 | $20 \times 10^6$ | $18 \times 10^6$ | $14 \times 10^6$ | $13 \times 10^6$ | $10 \times 10^6$ | $4 \times 10^6$ | $2 \times 10^6$ | $1 \times 10^6$ | $3 \times 10^5$ | 7000 |
| 11 | <1 | $20 \times 10^6$ | $21 \times 10^6$ | $16 \times 10^6$ | $14 \times 10^6$ | $6 \times 10^6$ | $1 \times 10^5$ | $1 \times 10^5$ | $1 \times 10^2$ | <10 | <10 |
| 12 | 9 | $20 \times 10^6$ | $13 \times 10^6$ | $13 \times 10^6$ | $8 \times 10^6$ | $5 \times 10^3$ | 400 | <100 | <10 | <10 | <10 |

TABLE VI

| | | | ZYGOSACCHAROMYCES GLOBIFORMIS | | | | | | |
|---|---|---|---|---|---|---|---|---|---|
| Sample | Count Initial | Initial Inoculated | 1 Hour | 3 Hour | 5 Hour | 24 Hour | 48 Hour | 72 Hour | 96 Hour | 120 Hour |
| 1 | 7 | $11 \times 10^3$ | $7 \times 10^3$ | $3 \times 10^3$ | 900 | 200 | <100 | <10 | <10 | <10 |
| 2 | 8 | $11 \times 10^3$ | $8 \times 10^3$ | $20 \times 10^3$ | $4 \times 10^3$ | 300 | <100 | <10 | <10 | <10 |
| 3 | 4 | $11 \times 10^3$ | $8 \times 10^3$ | $6 \times 10^3$ | $5 \times 10^3$ | $1 \times 10^3$ | <100 | <10 | <10 | <10 |
| 4 | <1 | $11 \times 10^3$ | $7 \times 10^3$ | $4 \times 10^3$ | $2 \times 10^3$ | 880 | 500 | <10 | <10 | <10 |
| 5 | <1 | $11 \times 10^3$ | $7 \times 10^3$ | $4 \times 10^3$ | $2 \times 10^3$ | $1 \times 10^3$ | <100 | <10 | <10 | <10 |
| 6 | 6 | $11 \times 10^3$ | $8 \times 10^3$ | $6 \times 10^3$ | $4 \times 10^3$ | $3 \times 10^3$ | 600 | <10 | <10 | <10 |
| 7 | <1 | $11 \times 10^3$ | $8 \times 10^3$ | $1 \times 10^3$ | 400 | 300 | <100 | <10 | <10 | <10 |
| 8 | 4 | $11 \times 10^3$ | $5 \times 10^3$ | 200 | 30 | 10 | <100 | <10 | <10 | <10 |
| 10 | <1 | $11 \times 10^3$ | $6 \times 10^3$ | $4 \times 10^3$ | $3 \times 10^3$ | $3 \times 10^3$ | $2 \times 10^3$ | 300 | <10 | <10 |
| 11 | <1 | $11 \times 10^3$ | $5 \times 10^3$ | $1 \times 10^3$ | 500 | 700 | <100 | <10 | <10 | <10 |
| 12 | 9 | $11 \times 10^3$ | $8 \times 10^3$ | $2 \times 10^3$ | 900 | $1 \times 10^3$ | <100 | <10 | <10 | <10 |

EXAMPLE III

An improved salad dressing composition was prepared in accordance with the present invention by taking 55 pounds of the starch paste, wet basis, prepared in accordance with Example I and emulsifying it with 37.39 pounds of cottonseed oil, 6.23 pounds of liquid egg yolk, 1.25 pounds of sodium chloride and the mold and yeast preventive agents set forth in Example I. The sodium benzoate and potassium sorbate are added in the amount of 0.06 pounds. The EDTA is added at a level of 0.003 pounds. The mixture was passed through conventional emulsification equipment and packaged into jars at a temperature of about 85°F. The salad dressing has a pH of about 3.9. Deterioration of flavor is prevented and yeast and mold growth, as well as bacterial deterioration is prevented.

EXAMPLE IV

An improved salad dressing composition is prepared in accordance with the invention by taking 85 pounds of the starch paste of Example I and mixing it with 12.46 pounds of cottonseed oil, 2.08 pounds of liquid egg yolk and 0.42 pounds of sodium chloride. Sodium benzoate was added at a level of 0.04 pounds, and potassium sorbate at a like level. EDTA and saccharin were added at a level of 0.0012 pounds. The mixture was emulsified and packaged into jars of about 85°F. The pH of the salad dressing product was about 3.9.

The various features of the invention were set forth in the following claims.

What is claimed is:

1. An improved, bland tasting emulsified oil dressing composition having high moisture and low fat and which is resistant to bacteriological spoilage at room temperature, comprising an edible oil in an amount of between about 1 percent and about 50 percent, moisture at a level of between about 40 percent and about 80 percent, egg yolk at a level of less than about 8 percent, yeast and mold preventive agent, bacterial nutrient ingredients at a level of less than about 1 percent by weight of the composition, and an edible acid, said edible acid being present at a level of between about 0.45 percent and about 1.8 percent equivalent glacial acetic acid by weight based on the level of moisture and providing a pH below about 4.1.

2. An emulsified oil dressing composition in accordance with claim 1 wherein the edible acid is present at a level of between about 0.45 percent and about 1 percent.

3. An emulsified oil dressing composition in accordance with claim 1 wherein the pH of said dressing is in the range of from about 3.5 to below about 4.1.

4. An emulsified oil dressing composition in accordance with claim 1 wherein said yeast and mold preventive agent is present at a level of from about 0.02 percent to about 0.2 percent by weight of the composition.

5. An emulsified oil dressing composition in accordance with claim 1 and further comprising starch at a level of from about 1 to about 8 percent by weight of said composition.

* * * * *

UNITED STATES PATENT AND TRADEMARK OFFICE
CERTIFICATE OF CORRECTION

PATENT NO. : 3,955,010
DATED : May 4, 1976
INVENTOR(S) : CHRIS CHOZIANIN ET AL.

It is certified that error appears in the above-identified patent and that said Letters Patent are hereby corrected as shown below:

Column 4, Line 66, "3.5 to 41" should read --3.5 to 4.1--.

Column 5, Line 19, after "protein", insert a comma.

Column 6, Line 19, "zygoscharramyces globiformis", should read --Zygosccharamyces globiformis--.

Column 7, Line 10, "inouclation" should read --inoculation--.

Column 7, Line 16, "Zygoscharramyces globiformis" should read --Zygosccharamyces globiformis--.

Column 7, Line 28, "medias" should read --media--.

Column 7, Line 29, "condusive" should read --conducive--.

Column 8, Line 2, "supernatent" should read --supernatant--.

Columns 9 and 10, Table IV, Sample 8, under the column headed "5 Hour" the entry "$3x106^6$" should read --$3x10^6$--.

Columns 9 and 10, Table VI, Sample 11, under the column headed "Count Initial" the entry "<11" should read --<1--.

Signed and Sealed this

Twenty-eighth Day of September 1976

[SEAL]

Attest:

RUTH C. MASON
*Attesting Officer*

C. MARSHALL DANN
*Commissioner of Patents and Trademarks*